April 16, 1935.   D. R. STAMY   1,997,756

FASTENING MEMBER

Filed Oct. 1, 1930

INVENTOR
DAVID R. STAMY.
BY
ATTORNEY

Patented Apr. 16, 1935

1,997,756

UNITED STATES PATENT OFFICE 1,997,756

FASTENING MEMBER

David R. Stamy, Detroit, Mich., assignor to Chrysler Corporation, Detroit, Mich., a corporation of Delaware Application October 1, 1930, Serial No. 485,685

5 Claims. (Cl. 24—213)

This invention relates to an improved fastening member, particularly for upholstery.

The main objects of the invention are to provide a fastening member of this kind which is adapted to resiliently clamp onto a covering element; to provide a clamping head on an upholstery fastening member which, when in use, is completely concealed from view; to provide a head of this kind that requires for its attachment, the formation of only a single slot or serration in the covering member; to provide a clamping head which has a pair of side elements, one for bearing upon each side surface of the covering member so as to hold the fastener against movement in either normal direction relative to the covering.

Further objects of the invention are to provide an improved upholstery fastener which is adapted to assist in securing a layer of surfacing material to a covering member; to provide a device of this character which is formed of an integral piece of material; and to provide a reversely bent flange on the fastening member which is located between the side elements of its clamping head and adapted to hold one side of the fastening member at an inclination to the covering member so as to permit the extremity of the flange to dig into the surface of the covering member or its finishing layer.

An illustrative embodiment of my invention is shown in the accompanying drawing, in which.

Figure 1:
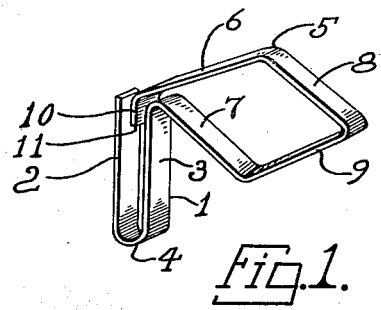
Fig. 1 is an enlarged perspective view of an upholstery fastener which embodies my invention.
Figure 2:
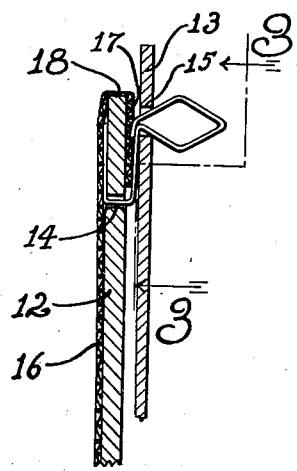
Fig. 2 is a vertical, fragmentary section of a support and covering showing an application of my improved fastener.
Figure 3:
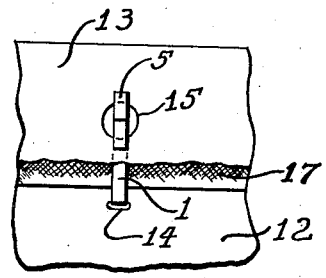
Fig. 3 is a vertical section taken on the line 3—3 of Fig. 2.

In the form shown in Figs. 1, 2 and 3, the improved upholstery fastener comprises an integral, ribbon-like strip of spring metal material which is reversely bent at one end portion so as to form a U-shaped clamping head 1 having spaced substantially parallel side elements 2 and 3 and an intermediate bowed portion 4. The other end portion of the metal strip is bent into a diamond shaped loop 5 which has its major axis substantially normal to the head 1. The loop 5 includes inner sides 6 and 7 which substantially converge at a location in close proximity to the head 1 and the outer sides 8 and 9 of the loop converge at the opposite extremity thereof forming a point which serves as a guide for facilitating insertion of the loop through a restricted aperture. Formed on the extremity of the side 6 of the loop is a lip or flange 10 which extends inwardly between the sides 2 and 3 of the head 1. This lip has a spaced, inwardly directed extremity 11.

The above fastener is particularly adapted for use in automobile body construction where it is employed for holding a stiff cardboard covering member 12 upon a support 13, such as a flange on a door or cowl panel. The cardboard or other suitable covering member 12 has a slot 14 which is located in close proximity to an aperture 15 in the support 13 and it is provided with a fabric, leather or other sutiable finishing layer 16. The marginal portions 17 of the finishing layer 16 are reversely folded around an edge 18 and disposed adjacent the inner side surface of the covering member 12, as shown in Fig. 2.

In securing a covering member of this type to a support with my improved upholstery fastener, the side element 2 of the head portion of the fastener is inserted through the slot 14 and extended between the finishing material 16 and the outer side of the covering member 12, the intermediate bowed portion 4 of the head member being located in the slot 14. The side element 3 of the head portion 4 bears upon the marginal portion 17 of the covering material 16, and the flange 10 is located between the marginal portions 17 and the side element 3 of the head. The flange 10 holds the side element 3 of the head portion at a slight inclination to the adjacent surface of the marginal portion 17 and the exposed extremity 11 of the flange is pressed into the marginal portion 17 of the covering member and holds the fastener against displacement from the covering member. The fastening members are thus detachably secured to the covering member 12 with the looped member protruding rearwardly.

The loop member is inserted, point first, through the restricted aperture 15 in the support 13 and as it passes through the aperture, its middle portions are contracted and after the minor axis of the loop passes through the aperture, the converging sides 6 and 7 bear against the edges of the aperture 15 drawing the side element 3 of the head portion 1 firmly against the outer side of the support 13. The entire fastener is concealed from view by the covering member and its finishing material. To remove the covering member 12 from the support 13, it is merely necessary to insert a wedge shaped tool, such as a screw driver between the side element 3 of the head 1 and the outer surface of the support 13.

Upon urging the loop outwardly in the direction of the covering member with a tool of this kind, the loop contracts permitting its retraction from the aperture 15.

Figure 4:
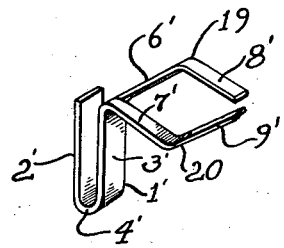
Fig. 4 is a perspective view of a modified form of the invention.

In the form shown in Fig. 4, the upholstery fastening member includes a head portion 1' which is substantially identical to the fastener head shown in Fig. 1, and which includes spaced sides 2' and 3' and an intermediate bowed portion 4'. The head portion 1' is formed at one end of a ribbon-like strip of resilient metal which is sheared longitudinally from one extremity forming arms 19 and 20. These arms extend outwardly from the head portion 1' and they are bowed or bent in respectively opposite directions at their medial portions. The ends of the arms 19 and 20 which are integral with the head portion 1', converge and the outer end portions slope towards each other. These arms thus form a split loop somewhat similar in shape to the loop 5 shown in Fig. 1. The sides 6', 7', 8' and 9' of the split loop formed by the arms 19 and 20 correspond in function with the sides 6, 7, 8 and 9, respectively of the loop 5, shown in Fig. 1, but by having the loop split at its outer end as shown in Fig. 4, the portion of the fastener which is received in a restricted aperture is compressed more readily during insertion of the arms through the aperture than during retraction of the arms from the aperture. Thus the device may be attached to a support with less effort than is required to remove it.

Figure 5:
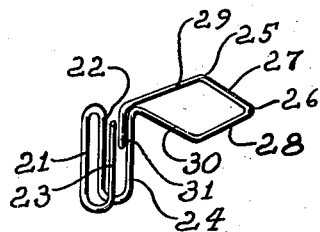
Fig. 5 is a perspective view of a further development of my invention.

In the form shown in Fig. 5, the fastening member is formed of a resilient wire having a round cross section. The intermediate portions 21 and 22 of the wire are bent into a U-shape and one end portion 23 of the wire is reversely bent and disposed in a plane which is parallel to and spaced from the plane of the intermediate portions 21 and 22. The plane in which the intermediate portions 21 and 22 lie is substantially normal to the plane in which the end portion 23 and the intermediate portion 21 lie. That portion of the wire which is adjacent the intermediate portion 22 is reversely bent with respect to the latter portion forming a section 24 which is parallel to the end portion 23 of the wire, the end portion 23 and the section 24 of the wire lying in a plane which is parallel to the plane of the intermediate portions 21 and 22. The spaced portions 21, 22, 23 and 24 form a gripping head having an open end for receiving the thickness of an article such as a covering member.

Formed on the end of the section 24 of the wire is a diamond shaped loop 25 which has its major axis normal to the planes in which the reversely bent portions of the wire lie. This loop has a pointed outer extremity 26 and includes converging side portions 27 and 28 which guide the loop during its insertion through an aperture. The inner sides 29 and 30 of the loop substantially converge at the junction of the head and loop and the side 29 is provided with an inwardly extending lip 31 which is located between the portions 22 and 24 of the head of the device and which has an exposed extremity that functions in the same manner as the extremity 11 of the flange 10, shown in Fig. 1.

Although but several specific embodiments of this invention have herein been shown and described, it will be understood that various changes in the size, shape and arrangement of parts may be made without departing from the spirit of my invention and it is not my intention to limit its scope other than by the terms of the appended claims.

What I claim is:

1. A fastening member including a U-shaped head portion having an open end for receiving the thickness of an article, the sides of said head portion being adapted to resiliently clamp upon the respectively opposite sides of said article, a contractible protruding member on said head portion, and a flange on said protruding member extending inwardly between the sides of said head portion for holding one side thereof at an inclination to the adjacent surface of said article.

2. A fastening member including a U-shaped head portion having an open end for receiving the thickness of an article, the sides of said head portion being adapted to resiliently clamp upon the respectively opposite side of said article, a contractible protruding member on said head portion, and a flange on said protruding member located between the sides of said head portion and having an exposed extremity for obstructing displacement of said fastener from said article.

3. A fastening member comprising an integral sheet metal strip having a reversely bent clamping portion formed at one end, a substantially continuous loop at the other end of said strip adjacent one side of said clamping portion, and a flange on one extremity of said strip extending between the sides of said clamping portion and having an exposed end edge for holding said fastening member against displacement from an article.

4. A fastening member comprising an integral sheet metal strip having a reversely bent clamping portion formed at one end, a substantially continuous loop formed at the other end portion of said metal strip having a pointed outer extremity for guiding said loop through a restricted aperture of an article and outwardly diverging side portions for urging a side of said clamping portion against said article, and a flange on one extremity of said strip extending between the sides of said clamping portion and having an exposed end edge for holding said fastening member against displacement from an article.

5. A fastening member comprising an integral strip of resilient metal having a reversely bent U-shaped portion at one end forming a clamping head, a diamond shaped loop at the other end of said strip adjacent said clamping head, the major axis of said loop being substantially normal to said head, and a flange on an extremity of said loop extending inwardly between the sides of said head.

DAVID R. STAMY.